(No Model.)

H. H. CANADAY.
Sulky Plow.

No. 231,210.                     Patented Aug. 17, 1880.

Witnesses:
Frank W. Heers.
P. C. Kenyon.

Inventor:
Hugh H. Canaday
By Thomas G. Orwig,
Attorney.

N. PETERS, PHOTO-LITHOGRAPHER, WASHINGTON, D. C.

UNITED STATES PATENT OFFICE.

HUGH H. CANADAY, OF FAIRFIELD, IOWA.

SULKY-PLOW.

SPECIFICATION forming part of Letters Patent No. 231,210, dated August 17, 1880.

Application filed June 26, 1880. (No model.)

*To all whom it may concern:*

Be it known that I, HUGH H. CANADAY, of Fairfield, in the county of Jefferson and State of Iowa, have invented an Improved Sulky-Plow, of which the following is a specification.

The object of my invention is, first, to save material and labor in the construction of a sulky-plow, and to thereby reduce its first cost; second, to provide a means for simultaneously adjusting the plow relative to the ground and the landside carriage-wheel relative to the carriage-frame by one motion of a hand-lever, and to thereby lessen the labor of the operator in controlling the plow, as required to favor the horses and to do good work by turning uniformly smooth furrows.

My invention consists, first, in a double elbow-shaped stub-axle having a rigid and slotted standard, being connected with the end of the principal carriage-axle in such a manner that it can be readily combined with a lock-bail and compound lever, and thereby vibrated to raise and lower the landside sulky-wheel at the same time that the plow is moved vertically in an opposite direction; second, in combining a lock-bail or bent rock-shaft, having a rigid arm to produce a lever of the first order, with a hand-lever of the second order, to produce a compound lever specially adapted for raising and lowering and controlling the depth of furrow of a plow suspended from the lock-bail and bent rock-shaft underneath the sulky-carriage, all as hereinafter fully set forth.

Figure 1:
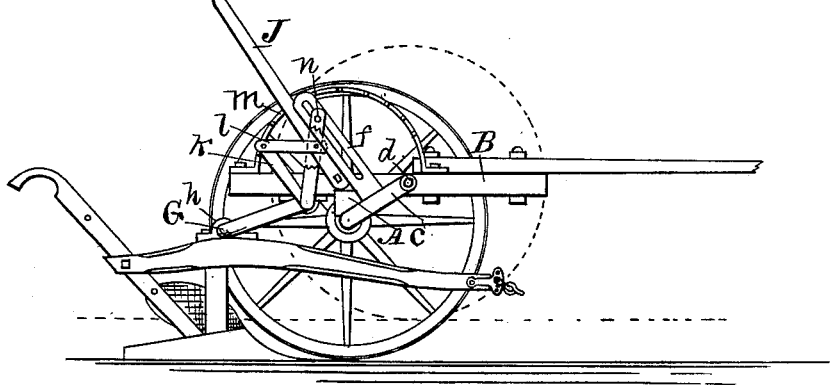
Figure 2:
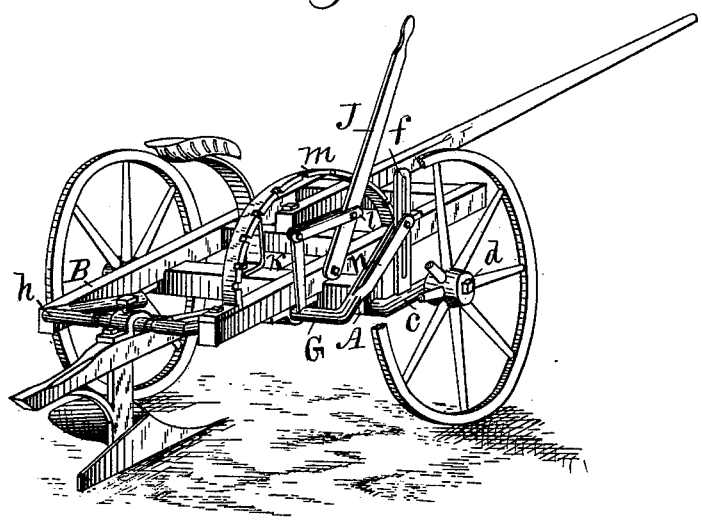

Figure 1 of my accompanying drawings is a side view, and Fig. 2 a perspective view, of my improved sulky-plow. Together they clearly illustrate the construction, operation, and utility of my invention.

A is the principal axle of the sulky-carriage. It is preferably made of a straight piece of hard wood.

B B are the side bars of a carriage-frame, rigidly fixed to the axle A in any suitable way.

C is a double elbow-shaped stub-axle, pivoted by means of suitable bearings to the end of the straight axle A in such a manner that it can be vibrated and the carriage-wheel on its spindle $d$ raised and lowered at pleasure, as required, to adjust the landside of the carriage relative to the plow and ground.

$f$ is a slotted standard rigidly connected with the stub-axle C. It may be formed integral therewith by casting the complete device in a mold, or it may be formed separately and rigidly attached by means of bolts, or in any suitable way, to serve as a lever for vibrating the stub-axle in its bearings as required to raise and lower the wheel carried on its spindle $d$. A stub-axle of common form is fixed to the opposite end of the axle A.

G represents my lock-bail in the form of a bent rock-shaft. It is attached to the under side of the side bars, B, of the carriage-frame, in rear of the axle A, by means of suitable bearings, in such a manner that its central portion, forming the bail $h$, will extend rearward between the rear ends of the side bars, B, where it can be adjusted vertically, as required, to raise and lower the plow that is connected therewith by simply rocking the shaft in its bearings.

J is a hand-lever of the second order, pivoted at its lower end to the carriage-frame at a point immediately over the axle A. $k$ is an arm formed on or rigidly attached to the rock-shaft and bail G $h$ at a point in line with the hand-lever J to produce a lever of the first order.

By flexibly connecting the upper end of the rigid arm $k$ with the fulcra-point of the lever J by means of a rigid link, $l$, I produce a compound lever, by means of which the operator can very easily raise and lower the plow attached to the bail $h$ by simply moving forward and backward the top end of the hand-lever J.

$m$ is a segmental rack fixed to the carriage-frame in such a position relative to the hand-lever J that it will engage a catch device on that lever, as required, to lock the combined levers and bail in various fixed positions.

$n$ is a rigid arm formed on or attached to the end of the rock-shaft G to extend upward and forward. Its free or upper end has a bridle-connection with the slotted standard $f$, that rises from the vibrating stub-axle C $d$. The stub-axle C $d$ $f$, carrying the landside wheel, when thus connected with the compound levers J $k$, can be readily operated like a lever of the first order, to facilitate the adjustments required for controlling the plow, lifting it from the ground, lowering it to the ground, and regulating its depth in the ground.

A rearward motion and adjustment of the hand-lever J relative to the rack $m$ will simultaneously lower the bail $h$, to which the plow is attached, and raise the spindle $d$, carrying the landside wheel, to thereby lower the landside of the sulky and level the complete carriage. A forward motion of the same lever will move the parts in opposite directions and simultaneously raise the plow and the landside of the carriage. It is therefore obvious that less power and less motion are required to adjust the plow and the carriage than when separate levers and separate actuating devices are independently operated to accomplish the results contemplated.

The draft required to operate the plow is applied to the front end of the plow-beam, and the carriage is guided by means of a pole.

I claim as my invention—

1. The combination of the combined rock-shaft and bail G $h$, having rigid arms $k$ $n$, and the hand-lever J, by means of a link, $l$, substantially as shown and described, for the purposes specified.

2. The combination of the rock-shaft and bail G $h$, having rigid arms $k$ and $n$, the lever J and link $l$, and the stub-axle C $d$, having a rigid standard, $f$, for the purposes specified.

3. The straight axle A, the carriage-frame B B, the stub-axle C $d$, having a standard, $f$, the combined rock-shaft and lock-bail G $h$, having rigid arms $k$ and $n$, the hand-lever J, the connecting-link $l$, and the rack $m$, arranged and combined substantially as shown and described, for the purposes specified.

HUGH HENRY CANADAY.

Witnesses:
JOHN SCHAEFER,
EDWARD TAYLOR.